US011777725B2

(12) United States Patent
Thorpe

(10) Patent No.: US 11,777,725 B2
(45) Date of Patent: *Oct. 3, 2023

(54) SECURE SELECTIVE RULES DRIVEN TOKEN INVALIDATION

(71) Applicant: Google LLC, Mountain View, CA (US)

(72) Inventor: Danny Thorpe, Mountain View, CA (US)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/662,836

(22) Filed: May 10, 2022

(65) Prior Publication Data

US 2022/0271921 A1   Aug. 25, 2022

Related U.S. Application Data

(63) Continuation of application No. 17/071,964, filed on Oct. 15, 2020, now Pat. No. 11,362,821.

(51) Int. Cl.
*H04L 9/08* (2006.01)
*H04L 9/40* (2022.01)

(52) U.S. Cl.
CPC .............. *H04L 9/088* (2013.01); *H04L 63/10* (2013.01)

(58) Field of Classification Search
CPC ..... H04L 9/088; H04L 63/10; H04L 63/0807; H04L 63/108; H04W 12/082; H04W 12/61

USPC ........................................................ 713/168
See application file for complete search history.

(56) References Cited

U.S. PATENT DOCUMENTS

| 11,362,821 | B2* | 6/2022 | Thorpe .................. H04L 9/088 |
| 2005/0132060 | A1* | 6/2005 | Mo ....................... H04L 51/212 709/227 |
| 2015/0046339 | A1* | 2/2015 | Wong ................. G06Q 20/4016 705/44 |
| 2016/0086184 | A1* | 3/2016 | Carpenter ............ G06Q 20/322 705/44 |

\* cited by examiner

*Primary Examiner* — Kambiz Zand
*Assistant Examiner* — Aubrey H Wyszynski
(74) *Attorney, Agent, or Firm* — Honigman LLP; Brett A. Krueger

(57) ABSTRACT

Secure selective token-based access control includes receiving a data access request from over a computer communications network, extracting a token from the request, selecting a decryption key for use in decrypting the token and attempting decryption of the token using the decryption key. Thereafter, on condition that the decryption key successfully decrypts the token into decrypted data, a creation date of the token in the decrypted data may be read and a rule applied to the creation date, the rule determining whether or not to expire the token. Finally, in response to a determination by the application of the rule to expire the token based upon the creation date of the token, the token is expired from subsequent use in authorizing servicing of the data access request, but otherwise the data access request is authorized for servicing.

20 Claims, 2 Drawing Sheets

SECURE SELECTIVE RULES DRIVEN TOKEN INVALIDATION

CROSS REFERENCE TO RELATED APPLICATIONS

This U.S. patent application is a continuation of, and claims priority under 35 U.S.C. § 120 from, U.S. patent application Ser. No. 17/071,964, filed on Oct. 15, 2020. The disclosure of this prior application is considered part of the disclosure of this application and is hereby incorporated by reference in its entirety.

TECHNICAL FIELD

The present disclosure relates to the field of access control and more particularly, the present disclosure relates to token-based access control.

TECHNICAL FIELD

Access control is a fundamental component of data security that dictates which individuals are permitted to access and use which computing information and resources. Authentication is part and parcel of access control. Authentication is the process of determining whether someone or something is, in fact, who or what it declares itself to be. Authentication technology provides access control for systems by determining whether or not the credentials of an end user match the credentials in a database of authorized users or in a data authentication server.

Token-based authentication is just one of many authentication methods used to create a more secure verification process. Token-based authentication requires each end user to obtain a computer-generated code or token before being granted access. Access tokens have been used in token-based authentication to allow an application to access the functionality of a computer program, often through invocation of an exposed operation of an application programming interface (API). In this regard, in token-based authentication, an application receives an access token after a user has successfully authenticated, and in response to the receipt of an access token, the application authorizes access thereto, and passes the access token as a credential when calling the target operation of the API.

As can be seen, in token-based access control, possession of a valid token oftentimes is all that is required for an end user or computing process to gain access to the functionality of a computer program. Consequently, the long-term integrity of the access token can be of paramount importance. Indeed, the longer an access token remains valid, the possible it may be that the token falls into the hands of an unauthorized or unintended end user.

SUMMARY

Examples of the present disclosure address deficiencies of the art in respect to access control and provide a novel and non-obvious method, system and computer program product for secure selective token-based access control.

One aspect of the disclosure provides a method for secure selective token-based access control. The method includes receiving, at data processing hardware of a computing platform, a data access request from over a computer communications network. The method further includes extracting, by the data processing hardware, a token from the request. The method also includes selecting, by the data processing hardware, a decryption key for use in decrypting the token and attempting decryption of the token using the decryption key. The method further includes, on condition that the decryption key successfully decrypts the token into decrypted data, reading, by the data processing hardware, a creation date of the token in the decrypted data and applying a rule to the creation date, the rule determining whether or not to expire the token. Responsive to a determination by the application of the rule to expire the token based upon the creation date of the token, the method includes expiring, by the data processing hardware, the token from subsequent use in authorizing servicing of the data access request, but otherwise authorizing servicing of the data access request.

This aspect may include one or more of the following optional features. In some examples, the rule is created before the creation date. In some configurations, the rule is specific to a user providing request. In some implementations, the rule is specific to a portion of an application targeted by the request and stored in a table.

Optionally, the method includes, on the condition that the decryption key successfully decrypts the token into decrypted data, by the data processing hardware, a user identification for the user providing the request in addition to the creation date of the token in the decrypted data. Here, the method also includes applying, by the data processing hardware, the rule to both the creation date and also the user identification to determine whether to expire the token.

Another aspect of the disclosure provides a data processing system adapted for secure selective token-based access control. The system includes a host computing platform having one or more computers, each with memory and at least one processor. The system also includes a set of applications executing in the memory of the host computing platform and a secure selective token-based access control module comprising computer program instructions executing in the memory of the host computing platform. The instructions cause the host computing platform to perform operations including receiving a data access request from over a computer communications network to access data in one of the applications in the set. The operations further include extracting a token from the request. Another operation includes selecting a decryption key for use in decrypting the token and attempting decryption of the token using the decryption key. The operations also include, on condition that the decryption key successfully decrypts the token into decrypted data, reading a creation date of the token in the decrypted data and applying a rule to the creation date, the rule determining whether or not to expire the token. Responsive to a determination by the application of the rule to expire the token based upon the creation date of the token, the operations include expiring the token from subsequent use in authorizing servicing of the data access request, but otherwise authorizing servicing of the data access request.

This aspect may include one or more of the following optional features. In some examples, the rule is created before the creation date. In some configurations, the rule is specific to a user providing the request. In some examples, the rule is specific to a portion of one of the applications targeted by the request.

In another configuration, the operations further include, on the condition that the decryption key successfully decrypts the token into decrypted data, determining a user identification for the user providing the request in addition to the creation date of the token in the decrypted data. Here, the operations also include applying the rule to both the creation date and also the user identification to determine whether to expire the token.

Another aspect of the disclosure provides computer program product for secure selective token-based access control. The computer program product includes a computer readable storage medium having program instructions embodied therewith. The program instructions are executable by a device to cause the device to perform operations comprising receiving a data access request from over a computer communications network. The operations also include extracting a token from the request and selecting a decryption key for use in decrypting the token and attempting decryption of the token using the decryption key. Another operation includes, on condition that the decryption key successfully decrypts the token into decrypted data, reading a creation date of the token in the decrypted data and applying a rule to the creation date. Here, the rule determines whether or not to expire the token. Another operation includes, responsive to a determination by the application of the rule to expire the token based upon the creation date of the token, expiring the token from subsequent use in authorizing servicing of the data access request, but otherwise authorizing servicing of the data access request.

This aspect of the disclosure may include one or more of the following features. In some examples, the rule is created before the creation date. In some implementations, the rule specifying an invalidation of the token past a specified date is created before a generation of the token. In some configurations, the rule is specific to a user providing request. In some examples, the rule is specific to a portion of an application targeted by the request and stored in a table.

In some implementations, on the condition that the decryption key successfully decrypts the token into decrypted data, the operations include determining a user identification for the user providing the request in addition to the creation date of the token in the decrypted data. Here, the operations may also include applying the rule to both the creation date and also the user identification to determine whether to expire the token.

The details of one or more implementations of the disclosure are set forth in the accompanying drawings and the description below. Other aspects, features, and advantages will be apparent from the description and drawings, and from the claims.

DESCRIPTION OF THE DRAWINGS

The accompanying drawings, which are incorporated in and constitute part of this specification, illustrate examples of the disclosure and together with the description, serve to explain the principles of the disclosure. The examples illustrated herein are presently preferred, it being understood, however, that the disclosure is not limited to the precise arrangements and instrumentalities shown, wherein.

Like reference symbols in the various drawings indicate like elements.

DETAILED DESCRIPTION

Examples of the disclosure provide for secure selective token-based access control. In accordance with an example of the disclosure, a data access request is received and a token extracted from the data access request. In so far as the token is an encrypted token, a decryption key is selected to decrypt the token. Upon decryption, a creation date of the token may be read from the decrypted token. An expiration rule may then be applied to the creation date in order to determine whether or not to expire the token. For instance, the rule may specify that the token expires after a specified number of days from the date of creation of the token and those number of days may vary based upon an identity of the end user issuing the data access request. As well, the number of days may vary based upon a specific portion of a specific application targeted by the data access request. In this way, the temporal life of the access token can be flexibly limited according to end user identity, target application portion and time.

Figure 1:
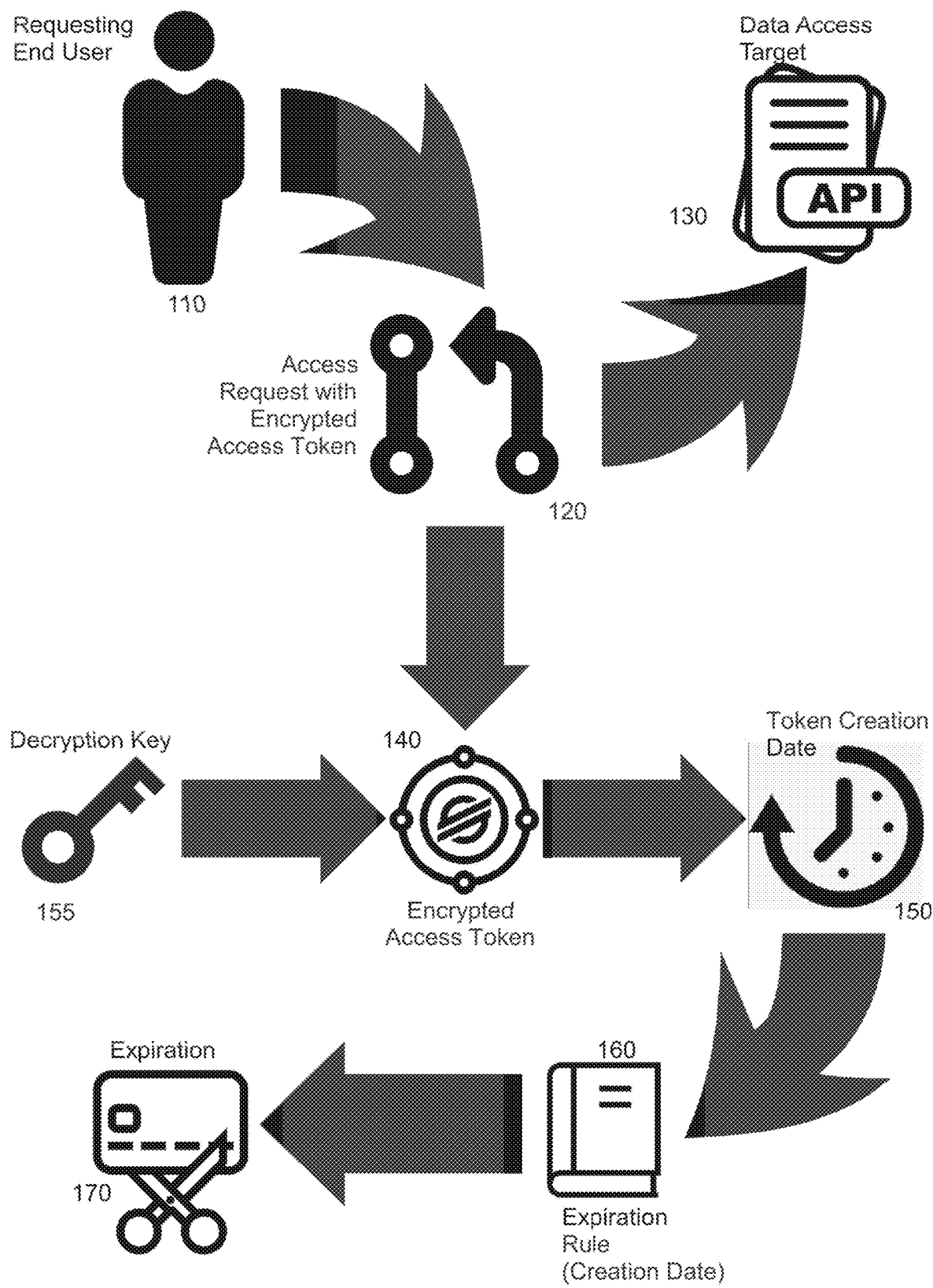
FIG. 1 is a pictorial illustration of a process for secure selective token-based access control.

In further illustration, FIG. 1 pictorially shows a process for secure selective token-based access control. As shown in FIG. 1, an end user 110 issues a data access request 120 to access a target portion of an application 130. The data access request 120 includes an encrypted access control token 140. The encrypted access control token 140 may be decrypted with decryption key 155 and a token creation date 150 of the encrypted access token 140 may be extracted therefrom. An expiration rule 160 is then selected for the data access request 120 and applied to the extracted token creation date 150 in order to determine whether or not to record an expiration 170 of the encrypted access token 140.

For instance, the expiration rule 160 may provide that upon a threshold number of days since the token creation date 150, the encrypted access token 140 is to be expired. The expiration rule 160 may vary, however, depending upon an identity of the requesting end user 110, the target portion of the application 130, or both. In any event, to the extent that the expiration 170 is not recorded for the encrypted access token 140, the encrypted access token 140 remains valid and able to be used to permit servicing of the access request 120 in accessing the target portion of the application 130.

Figure 2:
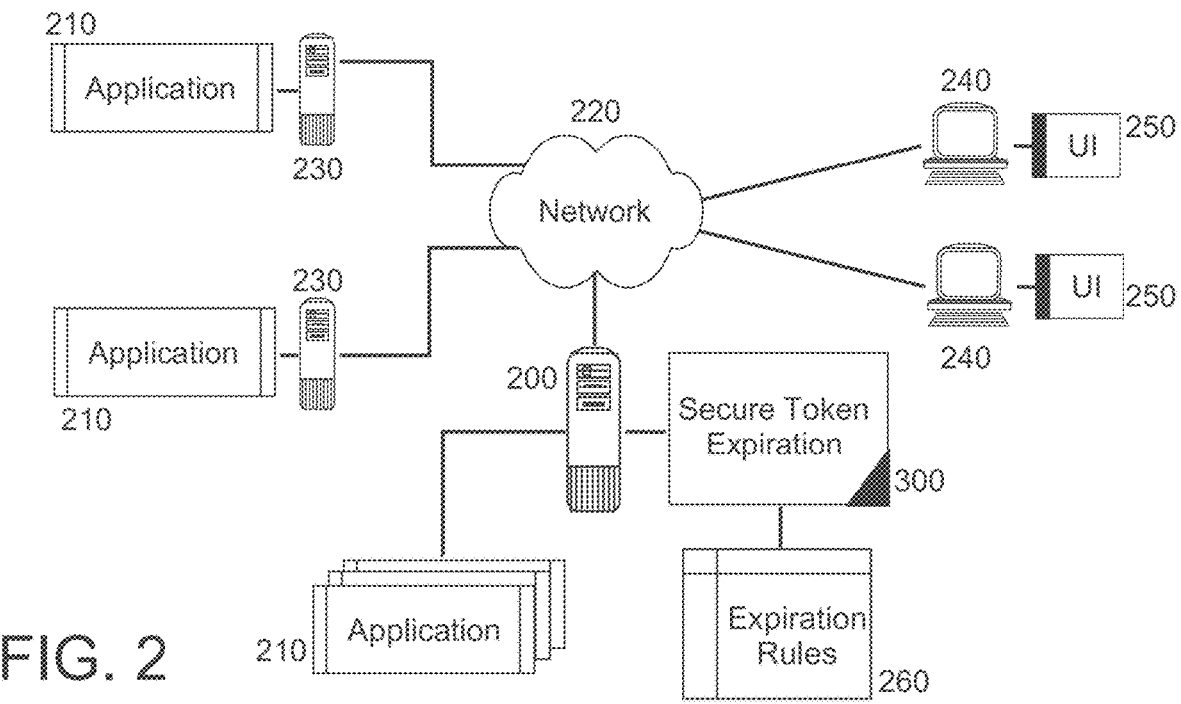
FIG. 2 is a schematic diagram of a data processing system adapted for secure selective token-based access control; and, FIG. 3 is a flow chart illustrating a process for secure selective token-based access control.

The process described in connection with FIG. 1 is implemented in a data processing system. In yet further illustration, FIG. 2 schematically shows a data processing system adapted for secure selective token-based access control. The system includes a host computing platform 200 that includes one or more computers, each with memory and at least one processor (i.e., data processing hardware). The host computing platform 200 is coupled to different remote servers 230 over computer communications network 220, each hosting the operation of one or more applications 210, each of the applications 210 exposing an API accessible from over the computer communications network 220 by different end users through the user interface 250 of a corresponding client computing device 240. The host computing platform 200 also may host the operation of one or more applications 210, each also exposing an API for accessing by the end users by way of a user interface 250 in a corresponding client computing device 240.

Of note, access requests received from the different client computing devices 240 from over the computer communications network 220 directed to specific target portions of correspondingly different ones of the applications 210 are permitted for service only to the extent that an accompanying token that is unexpired is present with the data access request. Consequently, a secure token expiration module 300 is included in the host computing platform 200. The secure token expiration module 300 includes computer program instructions which when executing in the memory of the host computing platform, are enabled to identify a user submitting a data access request for a target portion of one of the applications 210, to select a decryption key for an encrypted token included with the data access request, to decrypt the token with the key, to extract from the decrypted token a creation date of the token, to select a particular expiration rule from a table of rules 260 based upon either the identity of the end user, the target portion of the one of the applications 210, or both, and to determine whether or not to expire the token based upon the application of the selected rule to the extracted creation date.

Figure 3:
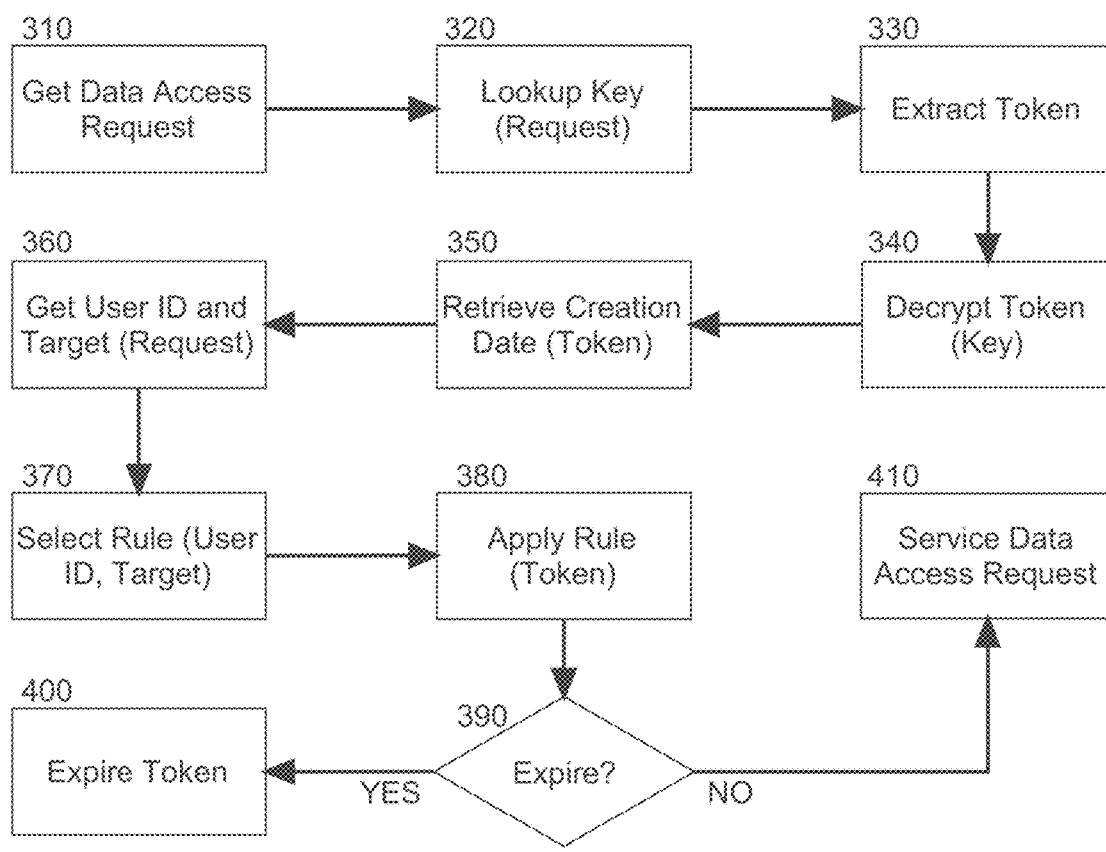

In even yet further illustration of the operation of the secure token expiration module 300, FIG. 3 is a flow chart illustrating a process for secure selective token-based access control. Beginning in block 310, a data access request is received to access a target portion of an application, for instance by invoking a specific operation within an API for the application. But, the servicing of the data access request is permitted only to the extent that an unexpired token accompanies the data access request. Consequently, in block 320, a decryption key is retrieved for the data access request in order to decrypt an encrypted token accompanying the data access request. In block 330, the encrypted token is extracted and decrypted with the selected key in block 340 and it is determined if the token is valid and not already expired.

In block 350, a creation date of the token is retrieved from the decrypted token. Then, in block 360, a user identifier for the end user issuing the data access request is determined along with an identity of the target portion of the application. In block 370, using the identity of the end user and target portion of the application, an expiration rule is selected from amongst a number of expiration rules in a table. Thereafter, in block 380 the selected expiration rule is applied to the creation date in order to determine if a threshold period of time has passed as specified in the selected rule, in consequence of which the token is to be expired. In decision block 390, if the application of the rule determines that the token is to be expired, in block 400 the token is expired by writing an expiration record to a table of expired tokens and the data access request is not serviced. But, otherwise, in block 410, the token is not expired and the data access request is serviced.

In consequence of the foregoing, unlike common practice, the foregoing process does not require recording expired tokens in a database table. Rather, relying only upon the token creation date and other data carried securely within the encrypted token, the application and/or access control module becomes freed from being required to wait for a possibly expensive database lookup to determine the validity of a token. No database lookup is needed. By not storing expired tokens, application performance improves and operational costs for data storage are reduced.

The present disclosure may be embodied within a system, a method, a computer program product or any combination thereof. The computer program product may include a computer readable storage medium or media having computer readable program instructions thereon for causing a processor to carry out aspects of the present disclosure. The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

Computer readable program instructions described herein can be downloaded to respective computing/processing devices from a computer readable storage medium or to an external computer or external storage device via a network. The computer readable program instructions may execute entirely on the user's computer, partly on the users computer, as a stand-alone software package, partly on the user's computer and partly on a remote computer or entirely on the remote computer or server. Aspects of the present disclosure are described herein with reference to flowchart illustrations and/or block diagrams of methods, apparatus (systems), and computer program products according to examples of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein includes an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various examples of the present disclosure. In this regard, each block in the flowchart or block diagrams may represent a module, segment, or portion of instructions, which includes one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Finally, the terminology used herein is for the purpose of describing particular examples only and is not intended to be limiting of the disclosure. As used herein, the singular forms "a", "an" and "the" are intended to include the plural forms as well, unless the context clearly indicates otherwise. It will be further understood that the terms "includes" and/or "including," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present disclosure has been presented for purposes of illustration and description, but is not intended to be exhaustive or limited to the disclosure in the form disclosed. Many modifications and variations will be apparent to those of ordinary skill in the art without departing from the scope and spirit of the disclosure. The example was chosen and described in order to best explain the principles of the disclosure and the practical application, and to enable others of ordinary skill in the art to understand the disclosure for various examples with various modifications as are suited to the particular use contemplated.

A number of implementations have been described. Nevertheless, it will be understood that various modifications may be made without departing from the spirit and scope of the disclosure. Accordingly, other implementations are within the scope of the following claims.

What is claimed is:

1. A computer-implemented method when executed by data processing hardware causes the data processing hardware to perform operations comprising
   receiving a data access request comprising an encrypted access control token;
   decrypting the encrypted access control token,
   extracting a creation date of the decrypted access control token from the decrypted access control token;
   determining an expiration rule for the decrypted access control token based on a target portion of an application;
   determining that the creation date of the decrypted access control token satisfies the expiration rule; and
   in response to determining that the creation date of the decrypted access control token satisfies the expiration rule, expiring the decrypted access control token.

2. The method of claim 1, wherein the operations further comprise, prior to the creation date, creating the expiration rule.

3. The method of claim 1, wherein the expiration rule is specific to a user associated with the data access request.

4. The method of claim 1, wherein the data access request requests access to the target portion of the application.

5. The method of claim 4, wherein the expiration rule is specific to the target portion of the application.

6. The method of claim 1, wherein determining the expiration rule comprises selecting the expiration rule from a plurality of expiration rules.

7. The method of claim 1, wherein determining the expiration rule comprises determining a user identification for a user associated with the data access request.

8. The method of claim 7, wherein determining the expiration rule further comprises selecting the expiration rule based on the target portion of the application and the user identification.

9. The method of claim 1, wherein determining the expiration rule comprises selecting the expiration rule from a table.

10. The method of claim 1, wherein expiring the decrypted access control token comprises writing an expiration record to a table of expired tokens.

11. A system comprising:
    data processing hardware; and
    memory hardware in communication with the data processing hardware, the memory hardware storing instructions that when executed on the data processing hardware cause the data processing hardware to perform operations comprising:
      receiving a data access request comprising an encrypted access control token;
      decrypting the encrypted access control token;
      extracting a creation date of the decrypted access control token from the decrypted access control token;
      determining an expiration rule for the decrypted access control token based on a target portion of an application;
      determining that the creation date of the decrypted access control token satisfies the expiration rule; and
      in response to determining that the creation date of the decrypted access control token satisfies the expiration rule, expiring the decrypted access control token.

12. The system of claim 11, wherein the operations further comprise, prior to the creation date, creating the expiration rule.

13. The system of claim 11, wherein the expiration rule is specific to a user associated with the data access request.

14. The system of claim 11, wherein the data access request requests access to the target portion of the application.

15. The system of claim 14, wherein the expiration rule is specific to the target portion of the application.

16. The system of claim 11, wherein determining the expiration rule comprises selecting the expiration rule from a plurality of expiration rules.

17. The system of claim 11, wherein determining the expiration rule comprises determining a user identification for a user associated with the data access request.

18. The system of claim 17, wherein determining the expiration rule further comprises selecting the expiration rule based on the target portion of the application and the user identification.

19. The system of claim 11, wherein determining the expiration rule comprises selecting the expiration rule from a table.

20. The system of claim 11, wherein expiring the decrypted access control token comprises writing an expiration record to a table of expired tokens.

* * * * *